Oct. 2, 1956      R. F. SICKLES      2,765,124
COIL WINDING APPARATUS
Filed Jan. 24, 1952
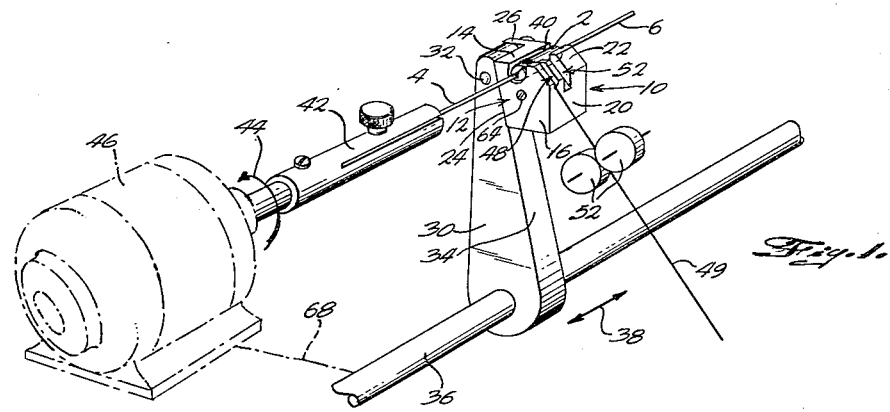
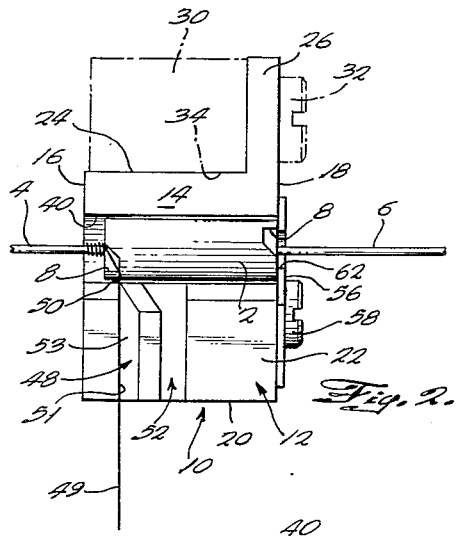
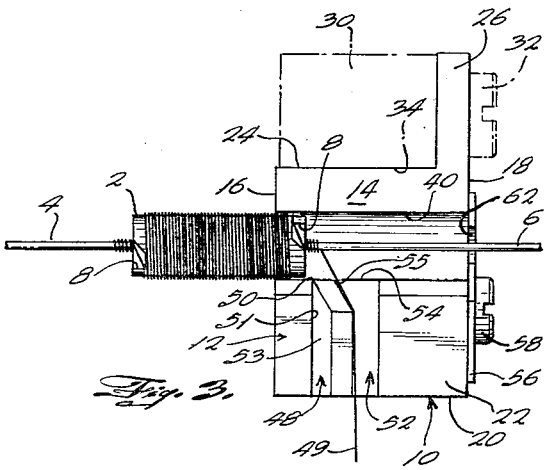
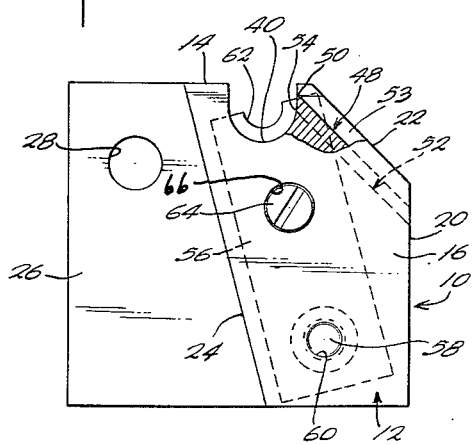
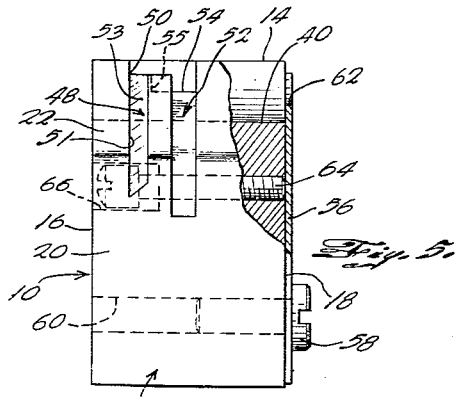
INVENTOR.
ROYAL F. SICKLES
BY
James and Franklin
ATTORNEYS

United States Patent Office 2,765,124
Patented Oct. 2, 1956

2,765,124

COIL WINDING APPARATUS

Royal F. Sickles, Springfield, Mass., assignor to General Instrument Corporation, Elizabeth, N. J., a corporation of New Jersey Application January 24, 1952, Serial No. 268,005

10 Claims. (Cl. 242—9)

The present invention relates to apparatus for the winding of coils, and in particular for the winding of small coils on coil forms.

The winding of coils, and particularly coils useable in communication equipment such as radio, radar and the like, is complicated by the fact that in many instances those coils must have very small dimensions and the coil wire must be very thin and fine. Usually coils of that type are wound on cylindrical forms of appropriately small size, those forms consequently being difficult to manipulate during the winding operation. In some instances the forms are hollow, in which case it is possible to use internally acting chucks for gripping, holding and rotating the forms so as to wind the wire therearound, but even then the gripping operation often results in deformation of the form or damage thereto, and a real production problem is presented in making electrical connections to the ends of the fine and very flexible wire of which the coil is formed. In other instances the coil form is solid, often being made of powdered iron or other magnetic material molded into proper shape and size. Such solid forms cannot be internally gripped, and therefore must be grasped at one or both ends in order to be supported and rotated during the winding operation. This obviously restricts the area of the form over which the wire can be wound, the gripping elements interfering with the winding of wire over the gripped portions thereof. This is obviously wasteful of material, and furthermore molded coils, particularly when made of powdered magnetic material, are quite subject to fracture or other damage by the gripping elements. With these coil forms, as with the hollow coil forms, making electrical connection to the coil ends represents a serious problem from a production point of view.

The present invention relates to apparatus particularly adapted for use with solid coil forms of small size, but also useable with other types of coil forms, which avoids the above disadvantages and which specifically permits the utilization of the entire length of the coil form without any danger of fracture, breakage or distortion thereof. Moreover, the apparatus of the present invention, when employed with coil forms having leads already attached thereto, greatly facilitates the making of electrical connection to the ends of the coil. To this end the apparatus of the present invention provides for the mounting of the coil form in an appropriately shaped passage in a support so that the form is free to rotate and slide longitudinally therewithin while it is being rotated. The means for rotating the coil is mounted externally of the support and may be connected to the coil form by any suitable rotation-transmitting element, even one which is not particularly rigid, thus eliminating the necessity for directly clamping or engaging the coil form itself. The support is provided with a passage through which the wire to be wound on the form is guided, that wire-guiding passage being inclined downwardly and outwardly with respect to the coil-supporting passage so that the tension of the wire as it is wound upon the form will retain the form in its supporting passage independently of any external clamping media. As a result the coil form can be rotated very rapidly even though it is but loosely received within the coil-supporting passage of the support and the wire will be wound upon the form in an efficient and rapid manner. As is conventional in other machines for winding coils of this type, the coil form, while it is being rotated, is translated in the direction of its length past the point at which the wire is fed thereon, thus causing the wire to form a coil helically wound along the length of the form. Since the form itself is not directly grasped, substantially the entire length of the form may be utilized to support the coil, and hence a coil of a given length may be wound on a form of substantially the same length.

When the coil is provided with leads already attached thereto, and particularly when those leads are axially disposed with respect to the coil form, the ends of the wire forming the coil may be wound around those leads while the coil form is in its supporting passage, so that after the coil winding operation is completed a unit is produced in which the fine coil-forming wire is secured in place, and readily manipulatable leads already electrically connected to the coil ends are presented for use in wiring the unit into an electrical circuit. In order to facilitate the winding of the coil wire on one of the leads after the coil proper has been wound on the coil form, the support may be provided with a second wire-guiding passage displaced from the first wire-guiding passage and also outwardly and downwardly directed, the wire being shifted from the first wire-guiding passage, through which it passes while the coil proper is being wound, to the second wire-guiding passage when the end of the wire is to be wound around the lead, the inner end of said second wire-guiding passage being so positioned as to facilitate that last operation.

To the accomplishment of the above, and to such other objects as may hereinafter appear, the present invention relates to the structure and operation of a coil winding apparatus as defined in the appended claims and as described in this specification taken together with the accompanying drawings in which:

Fig. 1 is a three-quarter perspective idealized view showing the apparatus of the present invention with a coil form mounted therein and with a coil partially wound thereon;

Fig. 2 is a top plan view of the support in which the coil form is mounted, showing a coil form in position with the coil wire wound around a lead extending from that coil form and about to be wound onto the coil form itself;

Fig. 3 is a view similar to Fig. 2 but showing the coil form in the position which it will assume after the coil has been completely wound thereon and while the trailing end of the wire is being wound about the second lead secured to the coil form;

Fig. 4 is a front elevational view, partially broken away, of the support which forms a part of the apparatus; and Fig. 5 is a side elevational view thereof, partially broken away.

The coil winding apparatus is here specifically disclosed as winding a coil onto a coil form generally designated 2, which form comprises a generally cylindrical molded body of powdered magnetic material or the like with leads 4 and 6 molded thereinto and extending coaxially from either end thereof. The form 2 is provided at its ends with peripheral notches 8 in order to facilitate transferring the wire between the coil form 2 and the leads 4 and 6 during the winding operation, and to retain the wire in wound position on the form.

The main component of the apparatus of the present invention is a support or steady nest generally designated 10 in which the coil form 2 is supported and with respect to which the coil form 2 is rotatable and longitudinally movable during the coil winding operation. This support may take the form of a block-like body 12 having a top surface 14, end surfaces 16 and 18, a side defined by vertical surface 20 and bevelled surface 22, and an opposite side surface 24, inclined with respect to the vertical, from which ear 26 extends, that ear being provided with an aperture 28. The support 10 is adapted to be mounted on a traverse arm 30, a screw 32 carried by the arm 30 passing through the aperture 28 in the ear 26 and the side surface 24 of the body 12 resting against the side surface 34 of the traverse arm 30. The traverse arm 30 is secured to rod 36 which is movable in the direction of the arrow 38 of Fig. 1, for a purpose hereinafter to be explained. The mechanism employed for moving the rod 36 may take any of a number of known forms and constitutes no part of the present invention.

The top surface 14 of the body 12 is provided with a groove 40 here shown as extending from end to end thereof and defining a coil-supporting passage. The bottom of this groove 40 is arcuate in nature and has a radius comparable to and preferably slightly greater than the radius of the combined coil form 2 and coil after the coil has been wound thereon. The depth of the groove 40 is greater than the radius of the said combined coil form 2 and coil, and is preferably substantially equal to or slightly greater than the diameter of the said combined coil form 2 and coil. As a result, the coil form 2 on which a coil is to be wound may be loosely received within the passage 40 by being dropped thereinto from above, the coil form 2 being movable within the passage 40 both rotatably and axially thereof. When the coil form 2 is thus positioned within the passage 40 one of its leads, designated 4, will project outwardly from the end of the passage 40 at the end surface 16 of the body 12 and the other lead, designated 6, will extend out from the other end of the passage 40 at the end surface 18 of the body 12. A clamp 42 is provided opposite the end surface 16 of the body 12, that clamp being adapted to grip the end of the lead 4 extending theretoward, and means are provided for rotating the clamp 42 in the direction of the arrow 44 of Fig. 1, that means being schematically shown as an electric motor 46 but being capable of assuming any conventional form. Since the lead 4, although flexible to an appreciable degree, is nevertheless sufficiently substantial as to be capable of transmitting rotation, rotation of the clamp 42 will cause the coil form 2 to which the lead 4 is secured to rotate within the passage 40 in the direction of the arrow 44.

The side surfaces 20 and 22 of the body 12 are provided with an open-topped groove 48 extending inwardly from the side surface 20 to the passage 40, being downwardly and outwardly inclined with respect to the passage 40, the angle of inclination being here shown as being approximately 45 degrees, and terminating at its inner end at a point 50 which is positioned above the bottom of the passage 40 and adjacent the periphery of the coil form 2 mounted in the passage 40. The side surface 51 of the groove 48 closer to the end surface 16 of the body 12 is perpendicular to the side surfaces 20 and 22 but the opposite side surface 53 of the groove 48 is outwardly inclined toward the end surface 18 of the body 12, as may best be seen from Fig. 5. The groove 48 defines a wire-guiding passage through which the wire 49 is led to the coil form 2, some external means, shown schematically in Fig. 1 as the rollers 52, ensuring that the wire is fed into the groove 48 from below its outer end, preferably with some drag tension, so as to be retained within that groove as it is wound onto the coil form 2. The inner end 50 of the groove 48 is preferably spaced above the bottom of the passage 40 by a distance greater than the radius of the combined coil form and coil but less than the diameter thereof so that the wire, as it is wound onto the coil form 2, will engage that coil form 2 from below its upper extremity, thus preventing it from jumping out from the passage 40, and this without requiring any clamps or other attachments active directly on the coil form 2.

It is preferred, in order to facilitate the winding of the wire on the lead 6, to provide the body 12 with a second wire-guiding open-topped groove 52 formed in the side surfaces 20 and 22 and displaced from the first wire-guiding groove 48 in the direction of the body end surface 18, the groove 52 also being outwardly and downwardly inclined with respect to the passage 40 and preferably extending in the same general direction as the groove 48. The inner end 54 of the groove 52 is positioned at a point closer to the bottom of the passage 40 than the inner end 50 of the first wire-guiding groove 48, and is preferably spaced from the bottom of the passage 40 by a distance less than the radius of said combined coil form and coil, so that when the wire passes through the groove 52 it may be wound upon the axially extending lead 6 from a point below the upper extremity thereof, thus tending to retain the coil form 2 within the passage 40 by the tension of the wire itself even when the end of the wire is being wound upon the lead 6. It will be noted that the inner portion 55 of the wire-guiding groove 52 is inclined toward the groove 48, this inclination facilitating transfer of the wire from the groove 48 to the groove 52.

In order to provide for accurate initial positioning of the coil form 2 within the passage 40, a resilient stop plate 56 is secured to the end body surface 18 at a point near the bottom of the body 12 by means of screw 58 received within aperture 60 formed in the body 12, the plate 56 extending along the body surface 18 so as to obstruct at least a portion of the end of passage 40 at the body end surface 18, the upper tip of the plate 56 being provided with a recess 62 so as to permit the lead 6 to extend out from the body 12 past the plate 56, the coil form 2 itself, however, being limited in its motion to and beyond the body end surface 18 by engagement with the plate 56. A screw 64 extends through the body 12 from the end 16 to the end 18, the head of that screw being received within countersunk orifice 66 at the body end surface 16, the tip of the screw engaging the plate 66 at a point intermediate between the passage 40 and the screw 58. Hence the degree to which the tip of the screw 64 extends beyond the body end surface 18 will determine the position of the upper end of the plate 56 relative to the passage 40. As the screw 64 is screwed into the body 12, its tip will bend the plate 56 away from the end body surface 18, and thus the upper portion of the plate 56 will be moved out in the direction of the length of the passage 40, thus defining an adjustably positionable stop for determining the initial position of the coil form 2.

In operation the coil form 2, with leads 4 and 6 attached, is dropped into the passage 40 and moved to the right as viewed in Figs. 2 and 3 until it engages the previously set stop plate 56. The lead 4 is then inserted in the clamp 42 and the clamp is tightened thereon. The operator takes the free end of the wire 49 which is to be wound about the coil form, insulation having been previously removed from the leading portion of that wire in the event that that wire is insulated, wraps the free end of the wire 49 around the lead 4 at a point somewhat spaced from the end of the coil form 2, and causes the clamp 42 to rotate, thus winding the wire 49 around the lead 4 and making electrical connection between that wire and the lead 4. After sufficient turns have been made to ensure proper connection, rotation of the clamp 42 is stopped, the operator passes the wire 49 through the notch 8 at the end of the coil form 2 adjacent the lead 4, and then inserts the wire 49 into the wire-guiding groove 48, making sure, either by passing the wire 49 between the rollers 52 shown in Fig. 1, by manually holding the wire 49 in a corresponding position, or by some other comparable means, that the wire 49 leads into the groove 48 from below its outer end, and preferably with a friction drag effect. Rotation of the clamp 42 is again initiated, and the wire is wound onto the coil form 2. While the clamp 42 rotates, relative motion in the direction of the length of the passage 40 takes place between the clamp 42 and the support 10 in such a direction that the coil form 2 is moved past the inner end 50 of the passage 48, thus winding the wire onto the coil form 2 in the form of a helix. This relative motion may be produced in any conventional manner, the broken line 68 in Fig. 1 schematically indicating a mechanical interconnection between the motor 46 and the rod 36 effective to move the rod 38 to the right as viewed in Fig. 1, thus moving the support 10 away from the clamp 42, as the clamp 42 is rotated. It will be understood that the same result would be achieved if the clamp were translated while the support 10 were held fixed in position. While the coil winding operation takes place the tension on the wire 49 retains the coil form 2 within the passage 40 despite the fact that it is loosely received in that passage and despite the fact that the flexibility of the lead 4 would otherwise tend to cause the coil form 2 to whip about at the high speeds at which it is rotated and fly out of the open-topped passage 40. The angle at which the wire-guiding passage 48 is inclined with respect to the coil supporting passage 40 and the spacing of the inner end 50 of the wire-guiding passage 48 from the bottom of the coil form 2 cooperate to ensure that the form 2 is retained within the passage 40.

After the required number of turns of wire have been wound on the coil form 2, which turns may take up substantially all of the length of the form 2, rotation of the clamp 42 is stopped. The operator then lifts the wire 49 from the wire-guiding groove 48 and moves it over into the wire-guiding groove 52, this transfer being facilitated by reason of the upward inclination of the right hand side surface 53 of the groove 48 toward the groove 52. The wire 49 is passed through the notch 8 at the end of the coil form 2 adjacent the lead 6, the spacing of the inner end 54 of the groove 52 from the bottom of the passage 40 ensuring that the wire 49 will then wind around the lead 6 from a point below the upper extremity thereof, so that when rotation of the clamp 42 is again started the trailing end of the wire, from which insulation has been previously removed, will wrap itself around the lead 6, thus making electrical connection between the coil and the lead 6, while at the same time ensuring that the coil form 2 will remain within the passage 40. At may best be seen from Fig. 3, it is entirely feasible that when this last winding is taking place the main portion of the coil form 2 can already have been slid longitudinally out of the passage 40 past the body end surface 16, but since the grooves 48 and 52 are appropriately spaced from the body end surface 16, some portion of the coil form 2 still remains within the open topped passage 40 for guiding and supporting purposes. It will be understood that the width of the support 10 and the location of the wire-guiding grooves 48 and 52 could be such that the coil form 2 is supported all along its length in the passage 40 no matter what the stage of the winding operation may be, but experience has shown that even if only a very small portion of the coil form 2 is thus supported, eminently satisfactory results are obtained.

After the end of the wire has been wound around the lead 6, rotation of the clamp 42 is stopped, the remainder of the wire 49, if any, is severed from the wound portion thereof, the clamp 42 is loosened, and a completely wound unitary composite coil form and coil is removed from the machine, the ends of the coil, even if formed of extremely fine wire, being already electrically connected to the comparatively substantial leads 4 and 6.

The coil winding apparatus of the present invention permits the rapid and efficient winding of coils on a mass production scale and the formation of a unit useable without further manipulation or operation. Since the coil form itself need not be clamped or gripped in any way, the entire length of that coil form, or whatever proportion of that length may be desired, can be used for coil winding purposes. Moreover, even if comparatively fragile or deformible coil forms are employed, damage to those forms is rendered negligible because they need not be directly gripped.

Although the present invention has been here disclosed for use with a specific type of solid molded coil form, and is particularly advantageous when used therewith, other more conventional coil forms could also be wound in this apparatus providing an element were attached to those forms so as to be grasped by the clamp 42. Moreover, while but a single embodiment of the present invention has been here disclosed, it will be apparent that many variations may be made in the details thereof, such as, for example, providing a cover for the coil-supporting passage 40 and/or one or more of the wire-guiding passages 48 and 52, without departing from the spirit of the invention as defined in the following claims.

I claim:

1. A coil winding apparatus for winding wire on coil forms having an element extending longitudinally therefrom comprising a support having a steep-sided coil-supporting passage having a depth greater than half its width into which a coil form having a diameter somewhat less than the width of said coil-supporting passage is adapted to be loosely received, said passage having an end opening through which said element is adapted to extend, said coil form being adapted to be slidable longitudinally in said coil-supporting passage a distance substantially equal to its own length without coming completely out from said passage, and said support having a wire-guiding passage extending from a side of said support inwardly to said coil-supporting passage, said wire-guiding passage being downwardly and outwardly inclined and terminating at its inner end at a point above the bottom and below the top of said coil-supporting passage, a clamp opposite the end opening of said coil-supporting passage for grasping said element extending from said coil form, means for rotating said clamp, and thus, via said element, rotating said coil form within said coil-supporting passage, and means for causing relative motion between said support and said clamp longitudinally with respect to said coil-supporting passage while said clamp is rotated.

2. The apparatus of claim 1, in which a second downwardly and outwardly inclined wire-guiding passage is provided in said support alongside said first mentioned wire-guiding passage, said second wire-guiding passage being displaced from said first wire-guiding passage axially of said coil-supporting passage, and in which said second wire-guiding passage terminates at its inner end at a point closer to the bottom of said coil-supporting passage than the inner end of said first wire-guiding passage, the inner end of said second wire-guiding passage terminates in a portion angled toward said first wire-guiding passage, and the side surface of said first wire-guiding passage nearer to said second wire-guiding passage is inclined outwardly toward said second wire-guiding passage.

3. The apparatus of claim 1, in which said coil-supporting passage is open at both ends so that said coil form can slide out therefrom in the direction of its length, a stop member being mounted on said support and obstructing the open end of said coil-supporting passage away from said clamp, and adjustable means on said support engageable with said stop member so as to position it longitudinally of said passage, thereby controlling the point on said coil form at which the coil is started by fixing the position of the coil form with respect to said wire-guiding passage.

4. A support for a coil form on which a coil is to be wound comprising a body, an open-topped steep-sided coil-supporting passage having a depth greater than half its width in the top of said body into which a coil form having a diameter somewhat less than the width of said coil-supporting passage is adapted to be loosely received and in which said coil form is supported while it is rotated, said coil form being slidable longitudinally in said passage a distance substantially equal to its own length without coming completely out therefrom, and a wire-guiding groove in a side of said body extending inwardly to said coil-supporting passage, said groove being downwardly and outwardly inclined and terminating at its inner end at a point above the bottom and below the top of said coil-supporting passage.

5. The apparatus of claim 4, in which a second downwardly and outwardly inclined wire-guiding groove is provided in said body alongside said first mentioned groove, said second groove being displaced from said first groove in the direction of the length of said coil-supporting passage, and in which said second wire-guiding passage terminates at its inner end at a point closer to the bottom of said coil-supporting passage than the inner end of said first wire-guiding passage, the inner end of said second wire-guiding passage terminates in a portion angled toward said first wire-guiding passage, and the side surface of said first wire-guiding passage nearer to said second wire-guiding passage is inclined outwardly toward said second wire-guiding passage.

6. The support of claim 4, in which said coil-supporting passage has a depth at least of the same order of magnitude as its width.

7. The apparatus of claim 6, in which a second downwardly and outwardly inclined wire-guiding groove is provided in said body alongside said first mentioned groove, said second groove being displaced from said first groove in the direction of the length of said coil-supporting passage, and in which said second wire-guiding passage terminates at its inner end at a point closer to the bottom of said coil-supporting passage than the inner end of said first wire-guiding passage, the inner end of said second wire-guiding passage terminates in a portion angled toward said first wire-guiding passage, and the side surface of said first wire-guiding passage nearer to said second wire-guiding passage is inclined outwardly toward said second wire-guiding passage.

8. A support for a coil form on which a coil is to be wound comprising a body having sides, ends and a top surface, said body having an open-topped coil-supporting passage formed in the top surface thereof extending longitudinally from end to end thereof, into which passage said coil form is received so as to extend longitudinally therein, said passage having steep sides and a depth greater than half its width, a resilient stop member secured to one end of said body at a point remote from said passage and extending along said end so as to at least partially obstruct one end of said passage, a screw adjustably passable through said body from the other end thereof to said one end and engaging said stop member at a point between its mounting point and said passage, a first wire-guiding groove in one side of said body extending outwardly and downwardly from said passage and terminating at its inner end at a point above the bottom of said passage by a distance greater than half the width and less than the width of said passage, and a second wire-guiding groove in said side of said body and extending in the same general direction as said first groove, said second groove being displaced from said first groove in a direction toward said stop member and terminating at its inner end at a point closer to the bottom of said passage than the inner end of said first groove.

9. The support of claim 8, in which said coil-supporting passage has a depth at least of the same order of magnitude as its width.

10. A support for a coil form on which a coil is to be wound comprising a body having sides, ends and a top surface, said body having an open-topped coil-supporting passage formed in the top surface thereof extending longitudinally from one end thereof, into which passage said coil form is received so as to extend longitudinally therein, said passage having steep sides and a depth greater than half its width, a first wire-guiding groove in one side of said body extending outwardly and downwardly from said passage and terminating at its inner end at a point above the bottom of said passage by a distance greater than half the width and less than the width of said passage, and a second wire-guiding groove in said side of said body and extending it the same general direction as said first groove, said second groove being displaced from said first groove and terminating at its inner end at a point closer to the bottom of said passage than the inner end of said first groove.

References Cited in the file of this patent

UNITED STATES PATENTS

| 78,129 | Rand | May 19, 1868 |
| 551,838 | Robertson | Dec. 24, 1895 |
| 892,659 | Getty | July 7, 1908 |
| 2,419,241 | Wingate | Apr. 22, 1947 |
| 2,579,074 | Helwick | Dec. 18, 1951 |

FOREIGN PATENTS

| 261,680 | Switzerland | Sept. 1, 1949 |